(12) United States Patent
Takahashi

(10) Patent No.: US 7,267,898 B2
(45) Date of Patent: Sep. 11, 2007

(54) FREEZE PREVENTION OF A FUEL CELL POWER PLANT

(75) Inventor: Shinichi Takahashi, Vernon, CT (US)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 138 days.

(21) Appl. No.: 10/470,043

(22) PCT Filed: Dec. 26, 2002

(86) PCT No.: PCT/JP02/13565

§ 371 (c)(1), (2), (4) Date: Jul. 24, 2003

(87) PCT Pub. No.: WO03/067694

PCT Pub. Date: Aug. 14, 2003

(65) Prior Publication Data

US 2004/0053096 A1   Mar. 18, 2004

(30) Foreign Application Priority Data

Feb. 8, 2002   (JP) ............... 2002-032392

(51) Int. Cl.
*H01M 8/04* (2006.01)

(52) U.S. Cl. .............. 429/22; 137/59; 204/229.4; 204/633; 210/143; 210/243; 165/200; 429/23

(58) Field of Classification Search ............ 210/85, 210/143, 149, 175, 184, 243, 266, 283, 284, 210/321.6, 662, 742; 429/13, 22–26; 252/71–77; 165/41, 200, 287; 180/65.1–65.3; 204/228.1, 204/229.4, 633, 638, 242; 137/78.1, 59; 236/12.1
See application file for complete search history.

(56) References Cited

U.S. PATENT DOCUMENTS

| | | | | |
|---|---|---|---|---|
| 3,470,865 A | * | 10/1969 | Mekjean | 126/400 |
| 4,344,850 A | * | 8/1982 | Grasso | 210/664 |
| 4,427,507 A | * | 1/1984 | van Aken et al. | 204/522 |
| 4,678,724 A | * | 7/1987 | McElroy | 429/34 |
| 4,818,638 A | * | 4/1989 | Roy | 429/20 |
| 5,174,902 A | * | 12/1992 | Shubert et al. | 210/662 |
| 5,194,159 A | * | 3/1993 | George et al. | 210/654 |

(Continued)

FOREIGN PATENT DOCUMENTS

| | | |
|---|---|---|
| DE | 100 00 514 | 8/2001 |
| EP | 0 982 283 | 3/2000 |
| EP | 1 061 600 | 12/2000 |
| JP | 08-185877 | 7/1996 |

(Continued)

*Primary Examiner*—Joseph Drodge
(74) *Attorney, Agent, or Firm*—MeDermott Will & Emery LLP

(57) ABSTRACT

A fuel cell power plant comprises a water circulation passage (5) which circulates the cooling water in a fuel cell stack (4). Sodium hydroxide which lowers the melting point of water is mixed with water in the water circulation passage (5) to prevent freezing of the water in the water circulation passage (5). Electrodes (11, 12) are disposed in the water. When the fuel cell stack (4) is running, a voltage is applied between the electrodes (11, 12) such that the positive electrode (11) attracts sodium ions, thereby removing sodium ions from the cooling water supplied to the fuel cell stack (4). When the fuel cell stack (4) stops running, sodium ions which were attracted to the positive electrode (11) are made to diffuse into the cooling water by ceasing to apply the voltage to the electrodes (11, 12).

15 Claims, 8 Drawing Sheets

U.S. PATENT DOCUMENTS

| | | | |
|---|---|---|---|
| 5,817,889 A * | 10/1998 | Pondebat et al. | 568/679 |
| 6,068,941 A | 5/2000 | Fuller et al. | |
| 6,187,197 B1 * | 2/2001 | Haddock | 210/641 |
| 6,361,891 B1 * | 3/2002 | Breault et al. | 429/26 |
| 6,416,891 B1 * | 7/2002 | Condit et al. | 429/13 |
| 6,440,595 B1 * | 8/2002 | Herdeg et al. | 429/26 |
| 6,448,535 B1 * | 9/2002 | Ap | 219/208 |
| 6,534,210 B2 * | 3/2003 | Luken et al. | 429/13 |
| 6,607,694 B1 * | 8/2003 | Blakemore et al. | 422/7 |
| 6,699,612 B2 * | 3/2004 | Breault et al. | 429/26 |
| 2002/0114984 A1 * | 8/2002 | Edlund et al. | 429/19 |
| 2004/0028963 A1 * | 2/2004 | Kormann et al. | 429/13 |

FOREIGN PATENT DOCUMENTS

| | | |
|---|---|---|
| JP | P2000-315514 A | 11/2000 |
| JP | P2001-15139 A | 1/2001 |
| JP | P2002-295848 A | 10/2002 |
| KR | 250 041 | 4/2000 |
| WO | WO 01/31726 | 5/2001 |

* cited by examiner

FREEZE PREVENTION OF A FUEL CELL POWER PLANT

FIELD OF THE INVENTION

This invention relates to prevention of water freezing in a fuel cell power plant.

BACKGROUND OF THE INVENTION

Many fuel cell power plants mounted in vehicles use a stack of polymer electrolyte fuel cells (PEFC). In this type of fuel cell, an electrolyte membrane must always be maintained in the wet state, so it is essential to supply it with water. It is also necessary to humidify fuel and air supplied to the polymer electrolyte fuel cell, and water is further used for cooling of the power plant.

Therefore, a considerable amount of water is used inside the power plant. If the outside temperature of the power plant drops below freezing point when it is not operating, this water will freeze, so undesirable effects may occur, i.e., the electrolyte membrane in the fuel cell stack may be damaged, or the startup time of the power plant may be lengthened.

Regarding this problem, Tokkai 2000-315514 published by the Japanese Patent Office in 2000 discloses an antifreeze apparatus for a fuel cell power plant. The apparatus collects water in a water passage of the power plant into a tank when the power plant terminates operation at low temperature, and supplies high temperature steam to the water passage when the power plant starts again to thaw the frozen water remaining in the water passage.

SUMMARY OF THE INVENTION

However, this prior art apparatus consumes a large amount of energy to thaw the frozen water, and the construction of the power plant is complicated by the water collecting mechanism.

Tokkai 2001-15139 published by the Japanese Patent Office in 2001 discloses an apparatus which adds an antifreeze such as methanol to the water tank so that the water required to warm up the fuel and oxidizing agent in the fuel cell power plant does not freeze. When the fuel or oxidizing agent is humidified using the water in this water tank, the water is heated by a heater to vaporize the antifreeze before it humidifies the fuel or oxidizing agent, so that antifreeze which would interfere with power generation by the fuel cell does not mix with the fuel or oxidizing agent. The vaporized antifreeze is then liquefied by cooling in a cooler, and is recirculated to the water tank.

However, in this apparatus, the antifreeze is limited to the water which humidifies the fuel and oxidizing agent. This apparatus heats the antifreeze to vaporize it, but if it is used to prevent freezing of the large amount of recirculated water such as cooling water in the power plant, a large amount of energy is consumed to vaporize the water.

It is therefore an object of this invention to prevent freezing of water in a fuel cell power plant with a low energy consumption.

In order to achieve the above object, this invention provides an antifreeze apparatus for a water circulation passage formed in a fuel cell power plant which generates power by a fuel cell stack. The apparatus comprises an antifreeze release/recovery mechanism functioning to release antifreeze into the water circulation passage and recover the antifreeze in the water circulation passage, a sensor which detects whether or not the fuel cell stack is operating, and a programmable controller.

The programmable controller is programmed to control the release/recovery mechanism to release the antifreeze into the water circulation passage when the fuel cell stack is not operating, and control the release/recovery mechanism to recover the antifreeze which has diffused into the water circulation passage when the fuel cell stack is operating.

This invention also provides an antifreeze apparatus comprising an antifreeze release/recovery mechanism functioning to release antifreeze into the water circulation passage when a water temperature of the water circulation passage is not higher than a predetermined temperature, and recover the antifreeze in the water circulation passage when the water temperature of the water circulation passage is higher than the predetermined temperature.

The details as well as other features and advantages of this invention are set forth in the remainder of the specification and are shown in the accompanying drawings.

DESCRIPTION OF THE PREFERRED EMBODIMENTS

Figure 1:
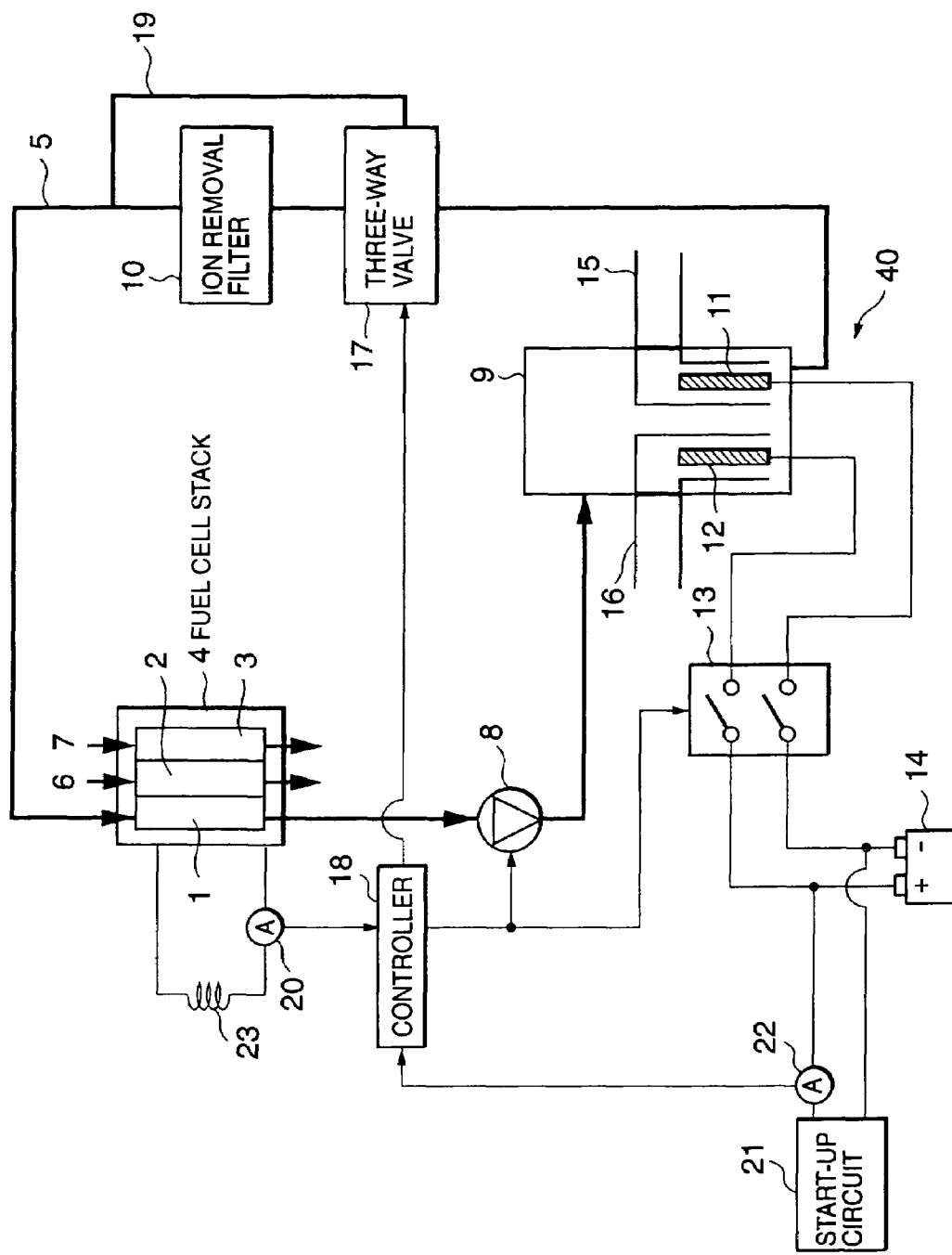
FIG. 1 is a schematic cross-sectional view of a water circulation apparatus for a fuel cell power plant according to this invention.

Referring to FIG. 1 of the drawings, a fuel cell power plant for vehicles generates power from a fuel cell stack 4 made of polymer electrolyte fuel cells. The fuel cell stack 4 generates power by a reaction between oxygen in air supplied from an air passage 6 to a cathode 2, and hydrogen in hydrogen-rich gas supplied from a fuel passage 7 to an anode 3. The power generated by the fuel cell stack 4 is supplied to an electric motor 23. It is also used to charge a secondary battery 14 via an electrical circuit, not shown.

The fuel cell stack 4 comprises a cooling water passage 1 for absorbing heat due to power generation.

A water circulation passage 5 is connected to the cooling water passage 1. The water circulation passage 5 is a closed circuit which passes through the cooling water passage 1. A pump 8, tank 9, three-way valve 17 and ion removal filter 10 are provided midway in the water circulation passage 5.

The pump 8 pressurizes water in the water circulation passage 5 downstream of the cooling water passage 1 and supplies it to the tank 9. The tank 9 is the sealed type, so that the interior of the tank 9 is pressurized by the operation of the pump 8, and water in the tank 9 is circulated through the water circulation passage 5 under this pressure. The ion removal filter 10 is a filter which removes impurities dissolved in the cooling water circulating through the water circulation passage 5, and the three-way valve 17 is a valve which selectively leads water from the water circulation passage 5 to the ion removal filter 17 or a bypass passage 19 which bypasses the ion removal filter 17. The change-over of the three-way valve 17 is performed according to a change-over signal from a controller 18.

An antifreeze release/recovery mechanism 40 is installed in the tank 9. The antifreeze release/recovery mechanism 40 comprises electrodes 11, 12 installed in the water in the tank 9, the switch 13 and the secondary battery 14.

The antifreeze is sodium hydroxide which is previously mixed with water in the tank 9. The sodium hydroxide is present in the ionic state in the water. When a voltage is applied from the secondary battery 14 via the switch 13 so that the electrode 12 becomes a positive electrode and the electrode 11 becomes a negative electrode, sodium ions in the water, which are cations accumulate around the negative electrode 11. Due to this accumulation, the antifreeze release/recovery mechanism 40 stores antifreeze. On the other hand, when application of the voltage to the electrodes 11, 12 is halted, the sodium ions mix with the recirculated water, and are released to the water circulation passage 5. In this state, if a voltage is again applied to the electrodes 11, 12, the sodium ions in the recirculated water again accumulate around the electrode 11, so that the substance flowing through the water circulation passage 5 is pure water.

The switch 13 respectively connects the positive electrode of the secondary battery 14 to the electrode 12 and the negative electrode of the secondary battery to the electrode 11 according to a connection signal from the controller 18. These connections are also broken according to an interruption signal from the controller 18.

The antifreeze, sodium hydroxide, is present in the ionic state in the water. Therefore, when power is supplied to the electrodes 11, 12, sodium ions which are anions are attracted to the negative electrode 11.

When a voltage is applied to the electrodes 11, 12, hydrogen gas is produced on the surface of the negative electrode 11 11 and oxygen gas is produced on the surface of the positive electrode 12. A duct 15 for discharging hydrogen gas and a duct 16 for discharging oxygen gas are connected to the tank 9, and the hydrogen gas and oxygen gas produced are released outside the tank 9, so that these gases do not increase the pressure inside the tank 9. One end of each of the ducts 15, 16 respectively projects inside the tank 9 so as to cover the electrodes 11, 12 from above, and the other end has an L-shaped bend inside the tank 9 which opens onto the outside of the tank 9.

The controller 18 operates the three-way valve 17 and switch 13 according to the running state of the fuel cell stack 4. Herein, the running state of the fuel cell stack 4 may be divided into running, startup and stop states. Running of the fuel cell stack 4 can be detected from the output current from the fuel cell stack 4 using an ammeter 20. Startup of the fuel cell stack 4 can be detected from the current supplied from the secondary battery 14 to a startup circuit 21 comprising a compressor or heater which supplies air to the fuel cell stack 4, using an ammeter 22.

When the current values detected by the ammeter 20, 22 are both zero, the fuel cell stack 4 has stopped running, when the current value detected by the ammeter 20 is zero but the current detected by the ammeter 22 is not zero, the fuel cell stack 4 is starting up, and when the currents detected by the ammeter 20, 22 are both not zero, the fuel cell stack 4 is running. Herein, the running of the fuel cell stack 4 means that the fuel cell stack 4 is generating electric power.

When the fuel cell stack has stopped, the controller 18 interrupts the switch 13 so that a voltage is not applied to the electrodes 11, 12. When a voltage is not applied to the electrodes 11, 12, the cathode 11 loses its power to attract sodium ions, and sodium ions which were staying around the cathode 11 diffuse through the cooling water. When the running of the fuel cell stack 4 stops, the pump 8 continues running for a short time after the switch 13 is interrupted, and diffusion of sodium ions into the cooling water is promoted. The pump 8 runs on a supply current from the secondary battery 14 according to a running signal from the controller 18. At this time, the three-way valve 17 is held in a position which leads cooling water to the bypass passage 19. Due to this operation, antifreeze diffuses throughout all of the water circulation passage 5 and cooling water passage 1 in the fuel cell stack 4, so that water in the water circulation passage 5 and cooling water passage 1 does not easily freeze even after the pump 8 has stopped running. Also, as the cooling water does not pass through the ion removal filter 10, sodium ions are not removed by the ion removal filter 10.

When the fuel cell stack 4 is starting up, the controller 18 runs the pump 8 and applies a voltage to the electrodes 11, 12. Due to this operation, cooling water circulates through the water circulation passage 5, sodium ions in the cooling water are attracted to the negative electrode 11 in the tank 9 during circulation, and build up around the negative electrode 11. Therefore, antifreeze can be recovered from the cooling water in a short time. At this time also, the three-way valve 17 is held in the position which leads cooling water to the bypass passage 19.

When the fuel cell stack 4 shifts from startup to running, the controller 18 continues to run the pump 8 and apply a voltage to the electrodes 11, 12, and the three-way valve 17 changes over to a position which leads cooling water to the ion removal filter 10. In this state, sodium ions have already built up around the cathode 11, and are not contained in the cooling water. Therefore, the ion removal filter 10 does not decrease the sodium ions.

By performing operation so that sodium ions in the cooling water are recovered by applying a voltage to the electrodes 11, 12 when the fuel cell stack 4 starts up, the cooling water passes through the ion removal filter 10 only when the fuel cell stack 4 is running, and removal of ions by the ion removal filter 10 is suppressed to the minimum. This operation prevents loss of antifreeze and has a desirable effect on maintaining the performance of the ion removal filter 10.

Next, referring to FIG. 2, the routine executed by the controller 18 to perform the above control will be described by a flowchart. This routine is executed as an interval of ten milliseconds irrespective of running, startup and stop of the fuel cell stack 4.

First, in a step S1, the controller 18 determines whether or not the detection current value of the ammeter 20 is zero. When the detection current value of the ammeter 20 is zero, in a step S2, it is determined whether or not the detection current value of the amateur 22 is zero.

When the detection current value of the ammeter 22 in the step S2 is zero, the fuel cell stack 4 is in the stop state. In this case, in a step S3, it is determined whether are not a predetermined time has elapsed from when the detection current value of the ammeter 20 became zero. This determination is a value for determining whether or not the fuel cell stack 4 has just stopped generating power. The predetermined time is preferably set equal to several minutes.

If the predetermined time has not elapsed, in a step S6, the pump 8 runs, the three-way valve 17 is held in the position which leads cooling water to the bypass passage 19, and the switch 13 is switched off so that a voltage is not applied to the electrodes 11, 12. Due to this operation, sodium ions which were staying around the electrode 11 diffuse through the water circulation passage 5 and cooling water passage 1 in the fuel cell stack 4.

After the predetermined time has elapsed, in a step S7, the running of the pump 8 is stopped, the three-way valve 17 is held in a position which leads cooling water to the bypass passage 19, and the switch 13 is held in the off state.

On the other hand, when in the step S2, the detection current value of the ammeter 22 is not zero, it means that the power plant is starting up. In this case, the controller 18, in a step S6, runs the pump 8, holds the three-way valve in the position which leads cooling water to the bypass passage 19, and switches on the switch 13 so that a voltage is applied to the electrodes 11, 12. Due to this operation, when the power plant starts up, cooling water is circulated through the water circulation passage 5, sodium ions are attracted to the negative electrode 11 in the in the tank 9 midway along the water circulation passage 5 and antifreeze is recovered from the cooling water.

When the detection current value of the ammeter 20 is not zero in the step S1, the fuel cell stack 4 has already started running. In this case, in the step S4, the controller 18 runs the pump 8, holds the three-way valve 17 in the position which leads cooling water to the ion removal filter 10, and switches on the switch 13 so that a voltage is applied to the electrodes 11, 12.

Due to this operation, pure water is supplied from the water circulation passage 5 to the cooling water passage 1 inside the fuel cell stack 4.

After performing any one of the steps S4-S7, the controller 18 terminates the routine.

Figure 3:
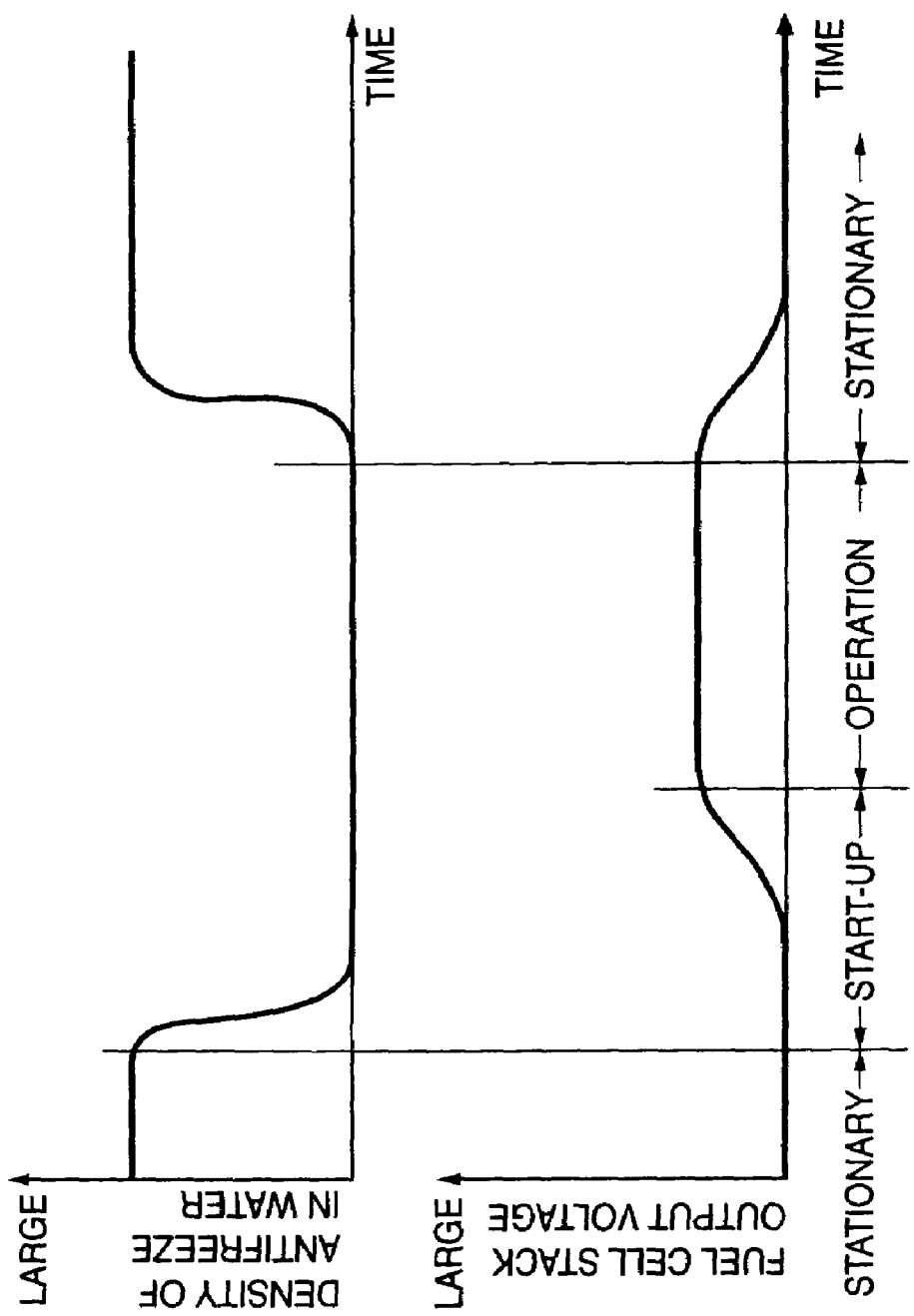
FIGS. 3A, 3B are timing charts describing the relation between antifreeze concentration during circulation of water, and output voltage of the fuel cell, according to this invention.

Referring to FIGS. 3A, 3B, while the fuel cell stack 4 has stopped running, the antifreeze concentration in the cooling water is maintained at a high level, so freezing of cooling water is prevented. When the fuel cell stack 4 starts up, the negative electrode 11 recovers antifreeze from the cooling water such that the antifreeze in the cooling water, i.e., the concentration of sodium ions, drops sharply. Therefore, when running starts after startup, the antifreeze concentration in the cooling water is maintained at zero. When the fuel cell stack 4 stops running, sodium ions which were attracted to the negative electrode 11 are released into the cooling water, so the sodium ion concentration in the cooling water increases sharply. Hence, release and recovery of antifreeze in the cooling water can be performed as required according to the running state of the fuel cell stack 4, and freezing of the power plant can be prevented without consuming a large amount of energy. Also, the time required for recovery of antifreeze can be adjusted by increasing or decreasing the voltage applied to the electrodes 11, 12.

In this embodiment, sodium hydroxide was used as the antifreeze, but any organic or inorganic substance which dissociates in water and reduces the freezing point of water may also be used as the antifreeze.

In this embodiment, the switch 13 connected the secondary battery 14 to the electrodes 11, 12, however a condenser may also be used instead of the secondary battery 14. Also, in a power plant comprising plural fuel cell stacks, current can also be supplied to the electrodes 11, 12 by the switch 13 from another fuel cell stack which has already started supplying power.

Further, as a more primitive example, the fuel cell stack 4 may be connected to the electrodes 11, 12 via the switch 13, and a voltage applied to the electrodes 11, 12 using the power generated by the fuel cell stack 4 which has started running. In this case, a voltage cannot be applied to the electrodes 11, 12 while the fuel cell stack 4 is starting up, but after the fuel cell stack 4 has started generating power, antifreeze can be recovered in a short time.

In this embodiment, the ion removal filter 10 and three-way valve 17 were provided, but these may be omitted. In this case, the operation of the three-way valve 17 in the steps S4-S7 is unnecessary.

Figure 4:
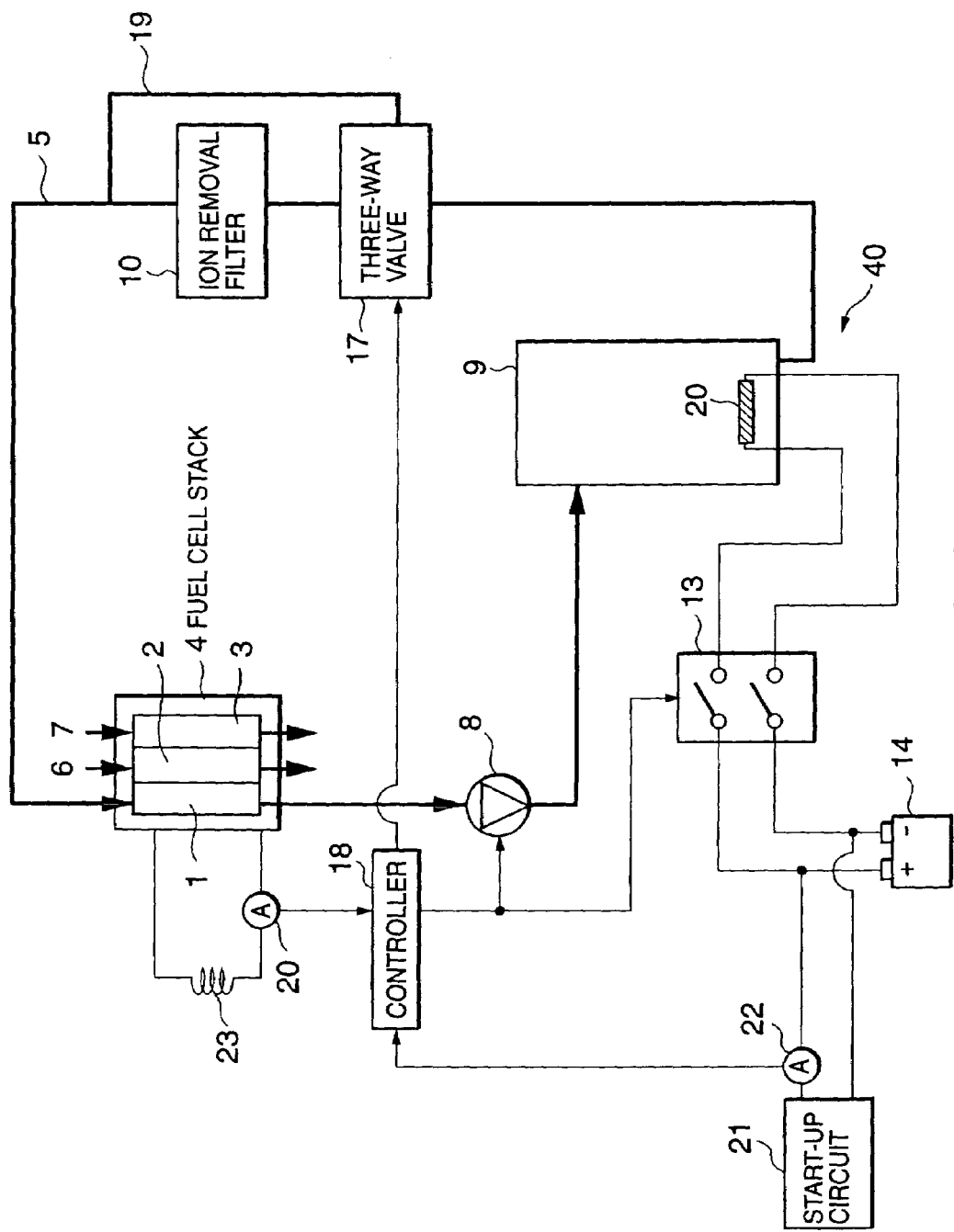
FIG. 4 is similar to FIG. 1, but showing a second embodiment of this invention.

Next, a second embodiment of this invention will be described referring to FIG. 4.

In this embodiment, an electromagnet 20 is disposed in the tank 9 instead of the electrodes 11, 12 as the antifreeze release/recovery mechanism 40. The electromagnet 20 is connected to the secondary battery 14 via the switch 13. Also, fine particles of a magnetic material which do not dissolve in water are used instead of sodium hydroxide as the antifreeze. The structure of the fine particles is such that they decrease the freezing point due to the phase change of water resulting from mutual interaction with water. Examples of fine particles having this property are porous fine particles, fine particles having surface imperfections, and fine particles coated with material having hydrophilic groups and hydrophobic groups.

Herein, magnetic fine particles having iron as the main component and a diameter of one micrometer (μm) are used as the antifreeze.

When the fuel cell stack starts up, the pump 8 runs, the switch 13 is switched on, and the electromagnet 20 is energized by the secondary battery 14. Due to the magnetic force, when the magnetic particles in the cooling water circulating in the water circulation passage 5 pass through the tank 9, the energized electromagnet 20 attracts the magnetic fine particles dispersed in the cooling water. As a result, the fine magnetic particles are removed from the cooling water. The switch 13 also remains in the on state and the fine magnetic particles remain attracted to the surface of the electromagnet 20 when the fuel cell stack 4 is running. Hence, diffusion and dispersion of the antifreeze can be performed using the fine particles of magnetic material which decrease the freezing point of water and the electromagnet 20 instead of an antifreeze which has dissociating properties and the electrodes 11, 12.

Figure 2:
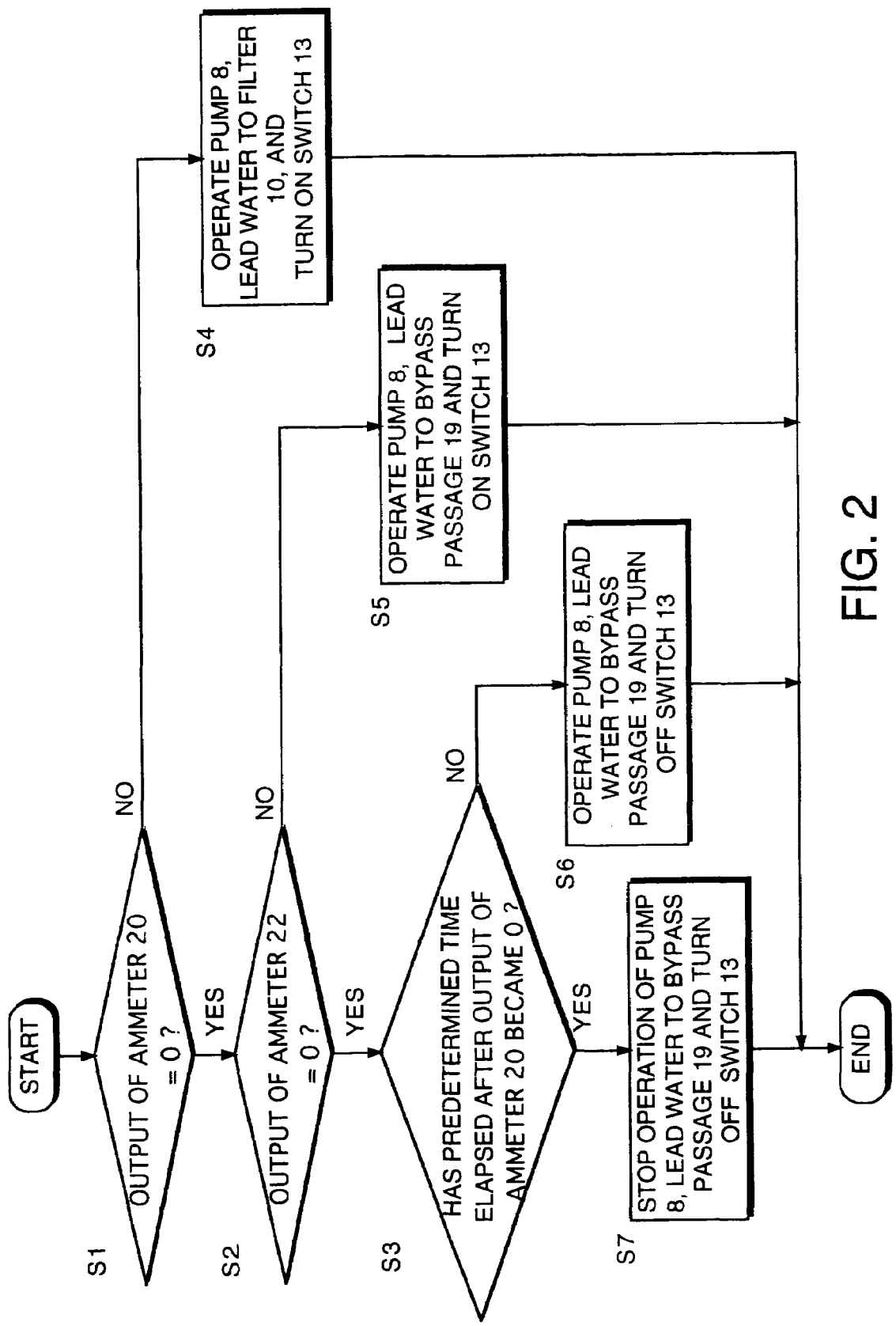
FIG. 2 is a flowchart describing an antifreeze diffusion and recovery routine executed by a controller according to this invention.

In this embodiment, the antifreeze diffusion and recovery routine executed by the controller 18 is identical to the routine of FIG. 2 in the first embodiment.

Figure 5:
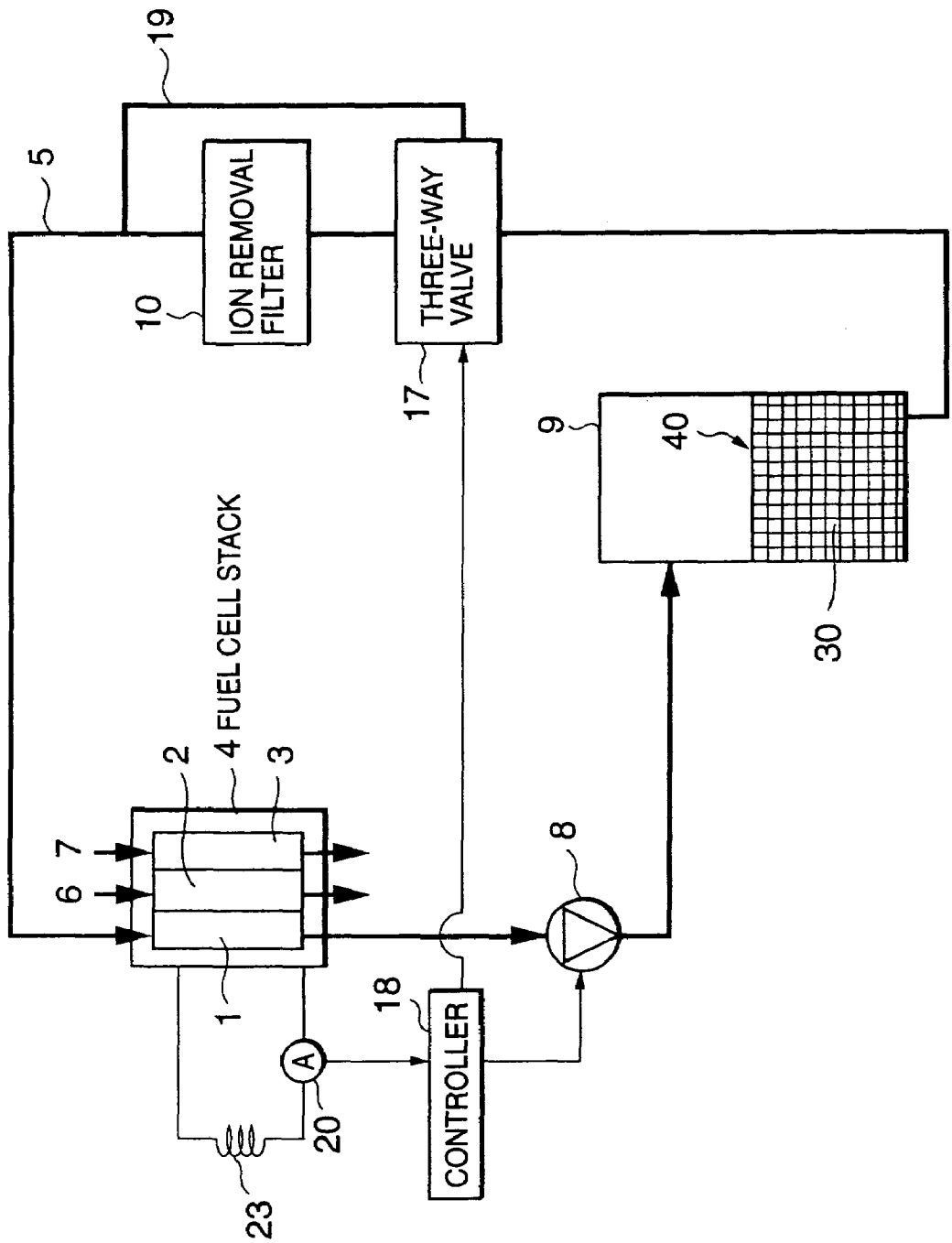
FIG. 5 is similar to FIG. 1, but showing a third embodiment of this invention.

Next, a third embodiment of this invention will be described referring to FIG. 5.

In this embodiment, sodium chloride which is a dissociating substance, is used as the antifreeze, and a polymer aggregate 30 having a temperature response is filled in the tank 9 instead of the electrodes 11, 12 of the first embodiment as the antifreeze release/recovery mechanism 40.

The temperature response polymer uses a molecular matrix obtained by treating a polymer material having n-isopropyl acrylamide as its main component, by the molecular template polymerization method. This temperature response polymer has a property whereby its high-order structure changes according to the temperature, i.e., it expands at low temperature and contracts at high temperature.

When the cooling water is at low temperature, sodium chloride is dissolved as ions in the cooling water. The molecular matrix of the temperature response polymer which forms the aggregate 30 in the tank 9 expands, so sodium chloride ions pass freely through it. When the temperature of the cooling water is raised, the molecular matrix shrinks, so sodium chloride ions in the cooling water flowing into the tank 9 are trapped, and the aggregate 30 gels.

In this way, the aggregate 30 collects the sodium chloride ions which constitute the antifreeze, from the cooling water, and releases them into the cooling water according to the temperature.

This temperature phase transition takes place at a boundary of approximately 30 degrees centigrade (° C.). When the cooling water temperature falls below this temperature, the molecular matrix of the temperature response polymer of the aggregate 30 expands again, so sodium chloride ions held therein are again released into the cooling water.

In this embodiment, electricity is not supplied to the aggregate 30, so the energy consuming for antifreeze recovery and release is basically zero. Further, the switch 13 is not used, so it is unnecessary to control the switch 13, and the controller 18 need only control the running of the pump 8 and the change-over of the three-way valve 17.

Other materials may also be used instead of the molecular matrix of n-isopropyl acrylamide as the temperature response polymer. Specifically, a polymer or gel having a compound structure of the temperature response polymer and another polymer, or a material wherein the temperature response polymer is crafted onto a fine particle surface, may be used.

Figure 6:
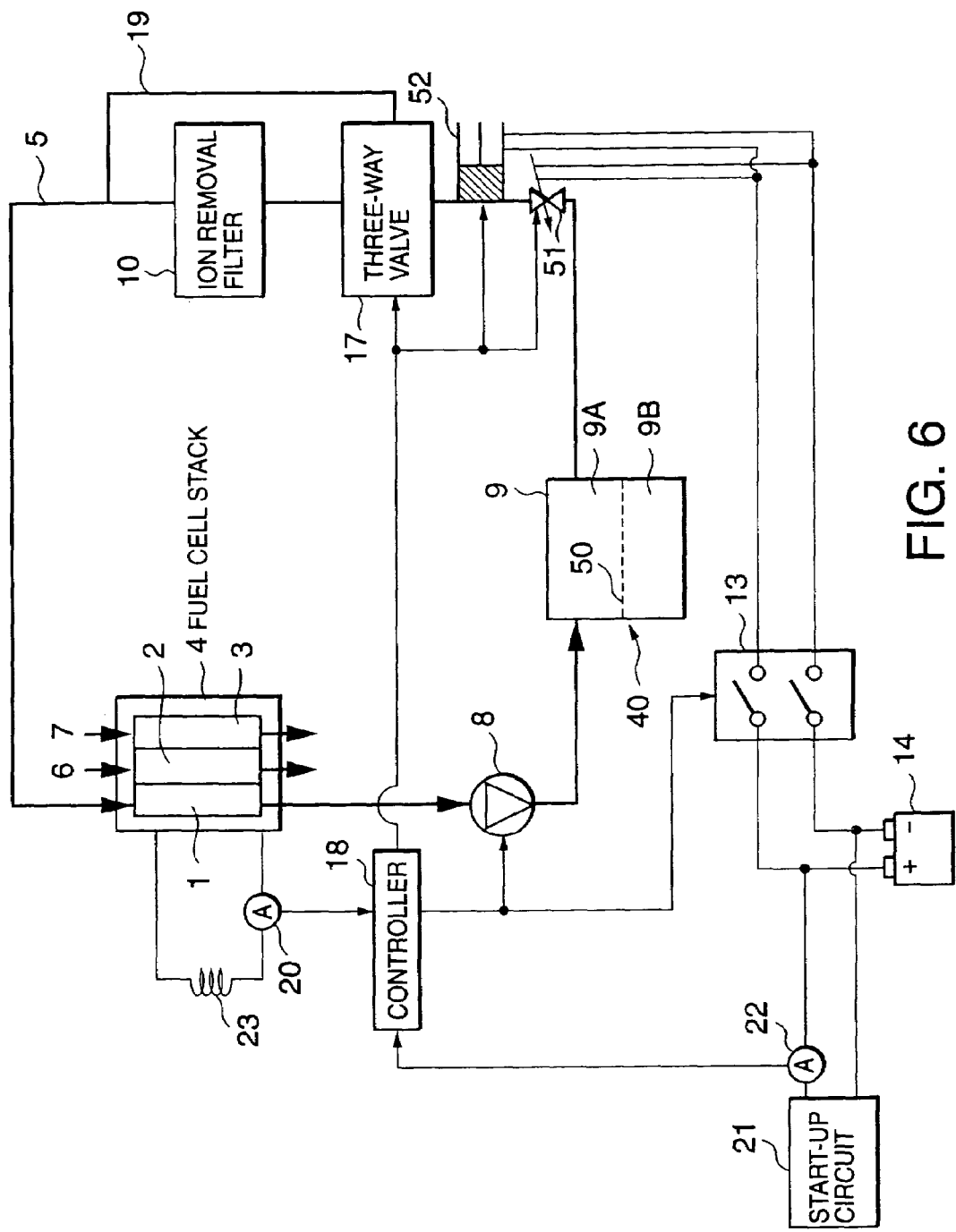
FIG. 6 is similar to FIG. 1, but showing a fourth embodiment of this invention.

Next, a fourth embodiment of this invention will be described referring to FIG. 6.

In this embodiment, the tank 9 is divided into chambers 9A, 9B by a permeable membrane 50 instead of the electrodes 11, 12 of the first embodiment, as the antifreeze release/recovery mechanism 40. The inlet and outlet of the tank 9 both face the chamber 9A. A valve 51 and pressurizing mechanism 52 are further provided between the tank 9 and three-way valve 17. Herein, an auxiliary pump may be used as the pressurizing mechanism 52. The permeable membrane 50 comprises for example a membrane made of polyamide or cellulose. The antifreeze comprises a material having molecular dimensions such that it passes through the permeable membrane 50 above a certain pressure, but does not pass through the permeable membrane 50 below the certain pressure.

In this embodiment, cooling water is circulated in the water circulation passage 5 under a predetermined pressure due to the running of the pump 8 when the fuel cell stack 4 is starting up or running. Due to this pressure, antifreeze passes from the chamber 9A to the chamber 9B, and antifreeze in the cooling water is recovered to the chamber 9B.

The rate of recovering antifreeze depends on the pressure of cooling water. When the fuel cell stack 4 starts up, the pump 8 runs, and the pressure in the chamber 9A can be raised by closing the valve 51 so as to increase the antifreeze recovery rate. Alternatively, the antifreeze recovery rate can also be increased by opening the valve 51, and raising the pressure of recirculating cooling water by the pressurizing mechanism 52. It is not absolutely necessary to provide both the valve 51 and pressurizing mechanism 52, and the antifreeze recovery rate may be varied by providing only one of them.

Figure 7:
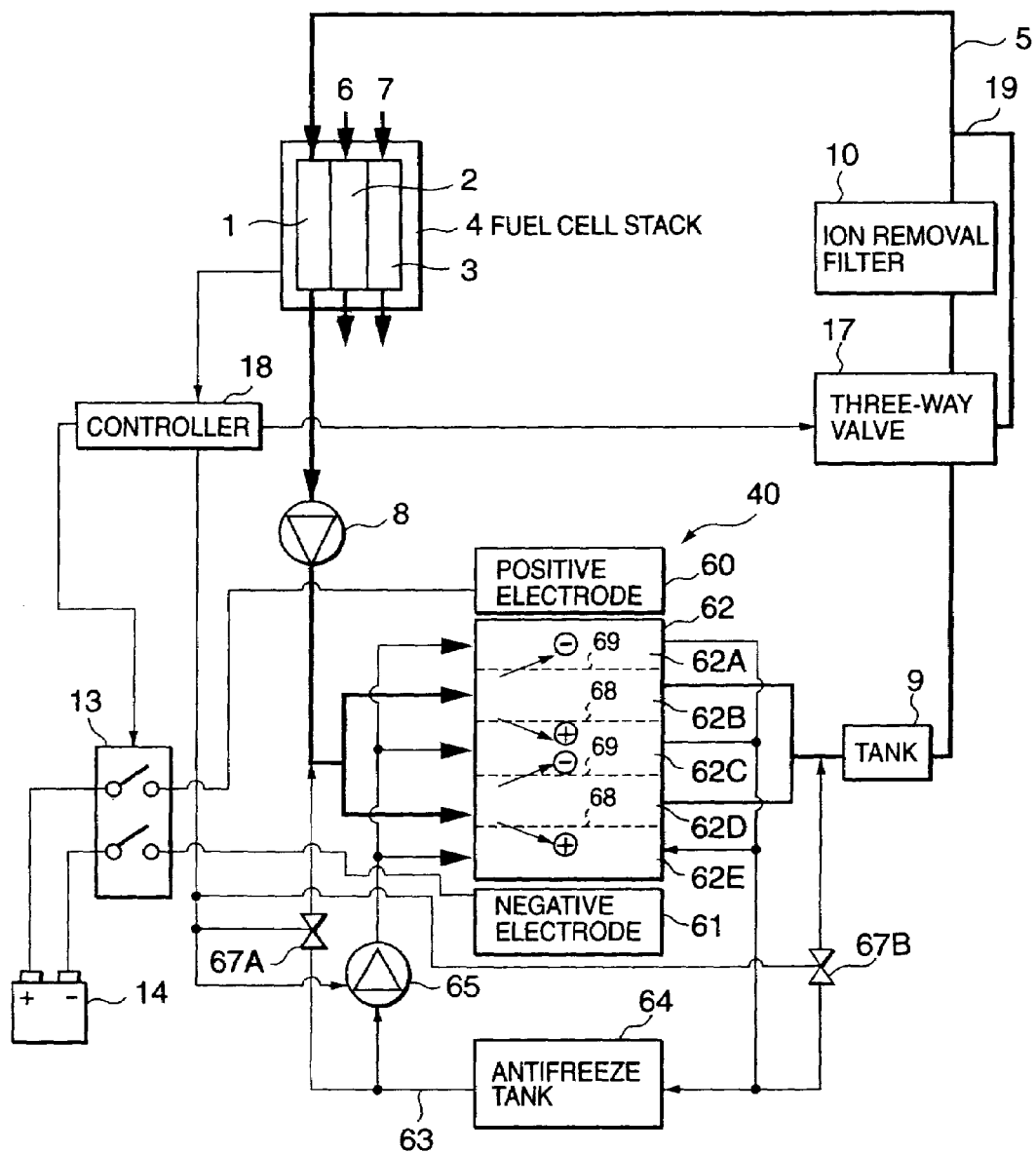
FIG. 7 is similar to FIG. 1, but showing a fifth embodiment of this invention.

Next, a fifth embodiment of this invention will be described referring to FIG. 7.

In this embodiment, an electrodialyzer 62 is disposed between a positive electrode 60 and a negative electrode 61 as the antifreeze release/recovery mechanism 40. The antifreeze is a substance having dissociating groups such as a salt, alcohol or sugar.

The electrodialyzer 62 has plural chambers 62A-62E partitioned by two anion exchange membranes 69 and two cation exchange membranes 68 which are disposed alternately.

One of the cation exchange membranes 68 is disposed nearest the negative electrode 61 and one of the anion exchange membranes 69 is disposed nearest the positive electrode 60.

The water supply passage 5 is connected to the electrodialyzer 62 so that cooling water in the water circulation passage 5 passes through the chambers 62B, 62D. The cooling water is not supplied to the chambers 62A, 62C, 62D.

When the cooling water led to the electrodialyzer 62 passes through the chambers 62B, 62D, anions in the cooling water are attracted to the positive electrode 60, and cations in the cooling water are attracted to the negative electrode 61 due to the potential difference between the positive electrode 60 and negative electrode 61. Therefore, anions flow from the chamber 62B to the chamber 62A via the anion exchange membrane 68. Likewise, cations flow to the chamber 62C via the cation exchange membrane 69. From the chamber 62D, anions flow to the chamber 62C via the anion exchange membrane 69 and cations flow to the chamber 62E via the cation exchange membrane 68.

An antifreeze circulation passage 63 comprising an antifreeze tank 64 and antifreeze pump 65, is formed via the chambers 62A, 62C as part of the antifreeze release/recovery mechanism 40. Further, a valve 67A is provided which supplies antifreeze in the antifreeze tank 64 to the water circulation passage 5 upstream of the electrodialyzer 62, and a valve 67B is provided which supplies antifreeze to the water circulation passage 5 downstream of the electrodialyzer 62.

When the fuel cell stack 4 has stopped, a voltage is not supplied to the electrode 60, 61, the valves 67A, 67B are opened, and antifreeze in the antifreeze tank 64 is released to the water circulation passage by running the antifreeze pump 65. As a voltage is not supplied to the electrodes 60, 61, the cooling water which passes through the electrodialyzer 62, passes through the chambers 62B, 62D without separation of antifreeze.

When the fuel cell stack 4 is starting up, the valves 67A, 67B are closed, and the switch 13 is switched on to apply a voltage to the electrodes 60, 61. As a result, anions pass from the chamber 62B into the chamber 62A, and cations pass into the chamber 62C. Also, cations pass from the chamber 62D into the chamber 62E and anions pass into the chamber 62C. As a result, antifreeze is separated from the cooling water, and is recovered by the antifreeze tank 64 via the antifreeze circulation passage 63. Pure water from which the antifreeze has been removed is supplied from the chambers 62B, 62D to the water circulation passage 5. After the antifreeze is recovered by the antifreeze tank 64, the fuel cell stack 4 is started up. There is no need to apply a voltage to the electrodes 60, 61 while the fuel cell stack 4 is running.

When the capacity of the antifreeze tank 64 is large, the antifreeze pump 65 may be omitted. Conversely, by providing the antifreeze pump 65, the antifreeze tank 64 can be made compact.

When the fuel cell stack 4 has stopped, when the antifreeze pump 65 is running, a negative voltage is applied to the positive electrode 60 and a positive voltage is applied to the negative electrode 62, antifreeze can be supplied from the chambers 62A, 62B, 62E to the cooling water in the chambers 62B, 62D.

If this operation is applied for supplying antifreeze to the water circulation passage 5, the valves 67A, 67B may be omitted.

In this embodiment, five chambers 62A-62E were formed using two anion exchange membranes 69 and two cation exchange membranes 68, but the number of chambers of the electrodialyzer 62 may be set as desired provided that the total number of ion exchange membranes is even, i.e., the number of chambers is odd.

Figure 8:
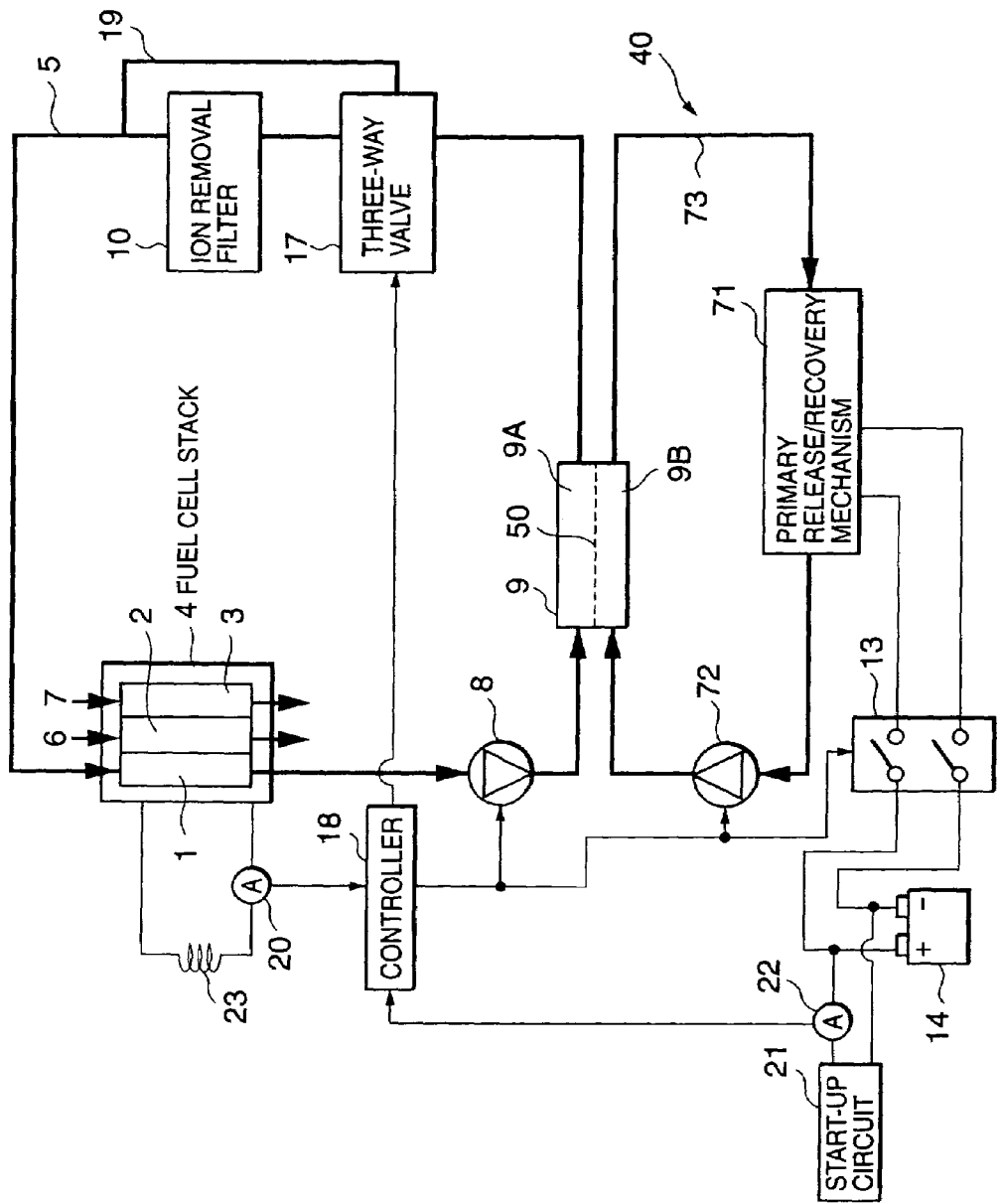
FIG. 8 is similar to FIG. 1, but showing a sixth embodiment of this invention.

Next, a sixth embodiment of this invention will be described referring to FIG. 8.

In this embodiment, the release/recovery mechanism 40 has the following construction.

Specifically, the tank 9 is divided into two chambers 9A, 9B in the same way as in the fourth embodiment. The water circulation passage 5 is connected to the chamber 9A. A second water circulation passage 73 is connected to the chamber 9B. In the second water circulation passage 73, a pump 72 and an antifreeze primary release/recovery mechanism 71 are provided.

The antifreeze primary release/recovery mechanism 71 has an identical construction to the release/recovery mechanisms 40 in any of the first-fifth embodiments. A material identical to that of the fourth embodiment is used as antifreeze.

When the fuel cell stack 4 has stopped, the antifreeze primary release/recovery mechanism 71 supplies antifreeze to the water in the second water circulation passage 73. As a result, a concentration difference arises between the antifreeze in the chambers 9A, 9B, and antifreeze passes from the chamber 9B to the chamber 9A via the permeable membrane 50.

On the other hand, when the fuel cell stack 4 is starting up, the antifreeze primary release/recovery mechanism 71 recovers antifreeze which has diffused into the second water circulation passage 73. As a result, as the antifreeze concentration in the chamber 9B is less than in the chamber 9A, antifreeze flows from the chamber 9A to the chamber 9B via the permeable membrane 50. As a result of this operation, the antifreeze in the water circulation passage 5 is also recovered by the antifreeze primary release/recovery mechanism 71. After recovery of antifreeze in the water circulation passage 5 is complete, running of the fuel cell stack 4 is performed.

In this embodiment, the antifreeze primary release/recovery mechanism 71 was provided in the second water circulation passage 73 instead of the circulation passage 5, so the circulation passage 5 is not affected by the pressure loss due to the antifreeze primary release/recovery mechanism 71. Therefore, there is the advantage that the pressure of the cooling water is not affected by antifreeze release/recovery operation.

The contents of Tokugan 2002-32392, with a filing date of Feb. 8, 2002 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, the above embodiments concern prevention of freezing of cooling water in the fuel cell stack 4. However, this invention is not limited to the cooling water in the fuel cell stack 4, and may also be applied to prevent any recirculated water used by a fuel cell power plant from freezing, including a recirculation circuit which circulates water to humidify fuel or an oxidizing agent as disclosed in the aforesaid Tokkai 2001-15139.

INDUSTRIAL FIELD OF APPLICATION

As described above, according to this invention, release of antifreeze into the water circulation passage and recovery of antifreeze from the water circulation passage can be repeatedly performed with a small energy consumption according to the running conditions of the fuel cell stack. Therefore, this invention has a particularly desirable affect when it is applied to a fuel cell power plant for driving a vehicle.

The embodiments of this invention in which an exclusive property or privilege is claimed are defined as follows:

1. An antifreeze apparatus comprising:
    a fuel cell stack;
    a water circulation passage circulating water and antifreeze through the fuel cell stack;
    an antifreeze release/recovery mechanism functioning to release antifreeze into the water in the water circulation passage upstream of the fuel cell stack and recover and store or collect antifreeze from the water in the water circulation passage downstream of the fuel cell stack;
    a sensor which detects whether or not the fuel cell stack is operating; and
    a programmable controller programmed to;
    control the release/recovery mechanism to release antifreeze into the water in the water circulation passage when the fuel cell stack is not operating; and
    control the release/recovery mechanism to recover and store or collect antifreeze which has diffused into the water in the water circulation passage when the fuel cell stack is operating.

2. The antifreeze apparatus as defined in claim 1, wherein the antifreeze comprises a substance which dissociates into an anion and a cation.

3. The antifreeze apparatus as defined in claim 2, wherein the release/recovery mechanism comprises a pair of facing electrodes in water, a power supply which applies a voltage between die electrodes, and a switch which controls application of the voltage between the electrodes by the power supply, and the programmable controller is further programmed to control the switch so that the voltage is not applied between the electrodes by the power supply when the fuel cell stack is not operating, and control the switch so that the voltage is applied between the electrodes by the power supply when the fuel cell stack is operating.

4. The antifreeze apparatus as defined in claim 3, wherein the apparatus further comprises a sensor which detects whether or not the fuel cell stack is starting up, and the controller is further programmed to control the switch, when the fuel cell stack is starting up, to apply the voltage between the electrodes by the power supply.

5. The antifreeze apparatus as defined in claim 4, wherein the fuel cell power plant further comprises a start-up circuit which operates by a power supplied from the power supply for starting up the fuel cell stack, and the sensor which detects whether or not the fuel cell stack is starting up, comprises an ammeter which detects a current supplied from the power supply to the start-up circuit.

6. The antifreeze apparatus as defined in claim 3, wherein the apparatus further comprises passages which discharge gas produced by the electrodes due to the application of the voltage between the electrodes by the power supply.

7. The antifreeze apparatus as defined in claim 3, wherein the power supply comprises a secondary battery which is charged by an electric power generated by the fuel cell stack.

8. The antifreeze apparatus as defined in claim 2, wherein the release/recovery mechanism comprises an anion exchange membrane, a first chamber facing the anion exchange membrane, a cation exchange membrane, a second chamber facing the cation exchange membrane, a third chamber facing the anion exchange membrane and the cation exchange membrane, a positive electrode which attracts anions contained in the water in the third chamber via the anion exchange membrane, a negative electrode which attracts cations contained in the water in the third chamber via the cation exchange membrane, and a power supply which applies a voltage between the positive electrode and the negative electrode.

9. The antifreeze apparatus as defined in claim 1, wherein the apparatus further comprises a pump which recirculates water in the water circulation passage, and the controller is further programmed to control the pump to stop running when the fuel cell stack is not operating and a predetermined time has elapsed from when the fuel cell stack stopped operation, while controlling the pump to keep running in other cases.

10. The antifreeze apparatus as defined in claim 1, wherein the sensor which detects whether or not the fuel cell stack is operating comprises an ammeter which detects an output current from the fuel cell stack.

11. The antifreeze apparatus as defined in claim 1, wherein the antifreeze contains fine particles of a magnetic material which decreases the melting point of water, and the release/recovery mechanism comprises an electromagnet which exerts a magnetic force on the water circulating through the water circulation passage, and a power supply which supplies an energization current to the electromagnet.

12. The antifreeze apparatus as defined in claim 1, wherein the release/recovery mechanism comprises a permeable membrane facing the water in the water circulation passage, a chamber partitioned from the water in the water circulation passage by the permeable membrane, and a pressurizing apparatus which pressurizes the water in the water circulation passage, and the antifreeze comprises a material which passes through the permeable membrane depending on a pressure.

13. The antifreeze apparatus as defined in claim 12, wherein the release/recovery mechanism further comprises a second water circulation passage connected to the chamber, a primary release/recovery mechanism functioning to release the antifreeze into the second water circulation passage and recover the antifreeze diffused in the second water circulation passage, and a pump which pressurizes the water in the second water circulation passage.

14. An antifreeze apparatus comprising:
a fuel cell stack;
a water circulation passage circulating water and antifreeze through the fuel cell stack;
an antifreeze release/recovery mechanism functioning to release antifreeze into the water circulation passage when a water temperature of the water circulation passage is not higher than a predetermined temperature, and recover and store or collect antifreeze in the water circulation passage when the water temperature of the water circulation passage is higher than the predetermined temperature, wherein the antifreeze release/recovery mechanism comprises a molecular matrix aggregate of a polymer material which expands when the water temperature is not higher than the predetermined temperature, and contracts when the water temperature is higher than the predetermined temperature, the water circulation passage being arranged to pass through the aggregate.

15. An antifreeze apparatus comprising:
a fuel cell stack;
a water circulation passage for circulating water and antifreeze through the fuel cell stack;
an antifreeze release/recovery mechanism functioning to release antifreeze into the water in the water circulation passage upstream of the fuel cell stack and recover and store or collect antifreeze from the water in the water circulation passage downstream of the fuel cell stack;
means for detecting whether or not the fuel cell stack is operating;
means for controlling the antifreeze release/recovery means to release the antifreeze into the water in the water circulation passage when the fuel cell stack is not operating; and
means for controlling the antifreeze release/recovery means to recover and store or collect antifreeze which has diffused into the water in the water circulation passage when the fuel cell stack is operating.

* * * * *